US009577768B2

(12) United States Patent
Hwang et al.

(10) Patent No.: US 9,577,768 B2
(45) Date of Patent: Feb. 21, 2017

(54) METHOD FOR DETERMINING A PERFORMANCE OF A MIMO COMMUNICATION AND COMMUNICATION DEVICE

(71) Applicant: Intel Corporation, Santa Clara, CA (US)

(72) Inventors: Yeong-Sun Hwang, Oberhaching (DE); Franz Eder, Burgthann (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/284,468

(22) Filed: May 22, 2014

(65) Prior Publication Data

US 2015/0341127 A1  Nov. 26, 2015

(51) Int. Cl.
*H04B 17/00* (2015.01)
*H04B 7/04* (2006.01)
*H04B 17/309* (2015.01)

(52) U.S. Cl.
CPC .......... *H04B 17/00* (2013.01); *H04B 7/0413* (2013.01); *H04B 17/309* (2015.01)

(58) Field of Classification Search
CPC .......... H04B 7/02; H04B 7/0456; H04B 7/10; H04B 17/00; H04B 7/0413; H04J 1/16; H04J 11/00; H04K 1/10; H04L 1/02; H04L 1/18; H04L 7/00; H04L 12/26; H04L 27/00; H04L 27/06; H04L 27/2649; H04L 27/28; H04W 4/00; H04W 72/04
USPC ........ 370/208, 252, 332, 334, 479; 375/141, 375/219, 224, 260, 267, 295, 316, 340, 375/341, 347; 703/2; 708/400
See application file for complete search history.

(56) References Cited

U.S. PATENT DOCUMENTS

| | | | |
|---|---|---|---|
| 2009/0196379 A1* | 8/2009 | Gan | H04L 1/0054 375/340 |
| 2010/0067563 A1* | 3/2010 | Wang et al. | 375/144 |
| 2013/0301749 A1* | 11/2013 | Aubert et al. | 375/267 |
| 2014/0321521 A1* | 10/2014 | Lee | H04W 24/02 375/227 |

OTHER PUBLICATIONS

Qiang et al., "A Low Complexity Post-Processing SNR Estimator for Non-linear Receiver in MIMO Systems", IEEE Proceedings Wireless Communications, Networking and Mobile Computing, 2009, 5 pages.
Abe et al., "Effective SINR Computation for Maximum Likelihood Detector in MIMO Spatial Multiplexing Systems", IEEE Globecom Proceedings, 2009, 5 pages.

* cited by examiner

*Primary Examiner* — Shawkat M Ali (57) ABSTRACT

A method for determining a performance of a MIMO communication is described comprising determining an estimate for the performance of the communication when using a first detection method, determining a measure of the orthogonality of a communication channel used in the communication and weighting the estimate for the performance of the communication when using the first detection method based on the orthogonality of the communication channel to generate an estimate for the performance of the communication when using a second detection method.

20 Claims, 7 Drawing Sheets

METHOD FOR DETERMINING A PERFORMANCE OF A MIMO COMMUNICATION AND COMMUNICATION DEVICE

TECHNICAL FIELD

Embodiments described herein generally relate to methods for determining a performance of a MIMO communication and communication devices.

BACKGROUND

Performance estimation of a MIMO (multiple-input multiple-output) communication is typically a key component of the estimation of the state of a channel between a MIMO transmitter and a MIMO receiver. For example, post-detection SINR is a metric that is widely used as a communication (or detection) performance measure. However, the post-detection SINR cannot be derived in closed-form for non-linear detectors such as maximum-likelihood detectors. Accordingly, approaches for determining a communication performance when using detection methods such as maximum-likelihood detection are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
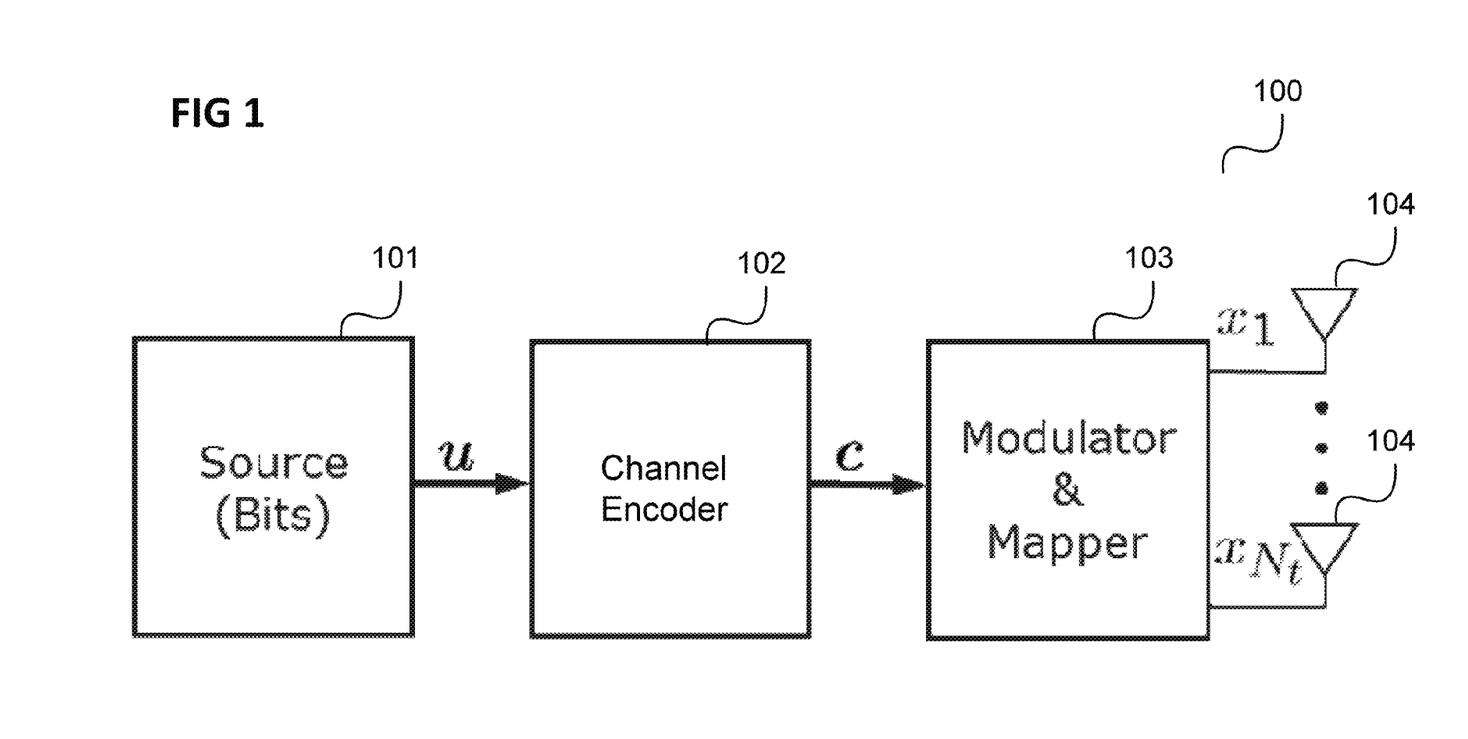
FIG. 1 shows a transmitter using multiple-input multiple-output (MIMO) transmission.

FIG. 1 shows a transmitter 100 using multiple-input multiple-output (MIMO) transmission.

In this example, the transmitter includes a channel encoder (e.g. a turbo encoder) 102 receiving bits to be sent from a data source 101. The channel encoder 102 codes the bits to be sent to coded bit segments. Each coded bit segment c is fed to a modulator and constellation mapper 103 which maps a segment of $N_t K$ coded bits c into an $N_t$-dimensional symbol vector x with components from a constellation set (e.g. an M-ary QAM set of size $M=2^K$, i.e. each component of x represents K coded bits). Each of the $N_t$ components (constellation symbols) of the symbol vector is then sent via one of $N_t$ transmit antennas 104.

The l-th component $x_l$ of x contains data for the l-th layer (or stream) of the overall data transmission. The vector x and its components $x_l$ (constellation symbols) are also referred to as s and $s_l$ in the following.

Figure 2:
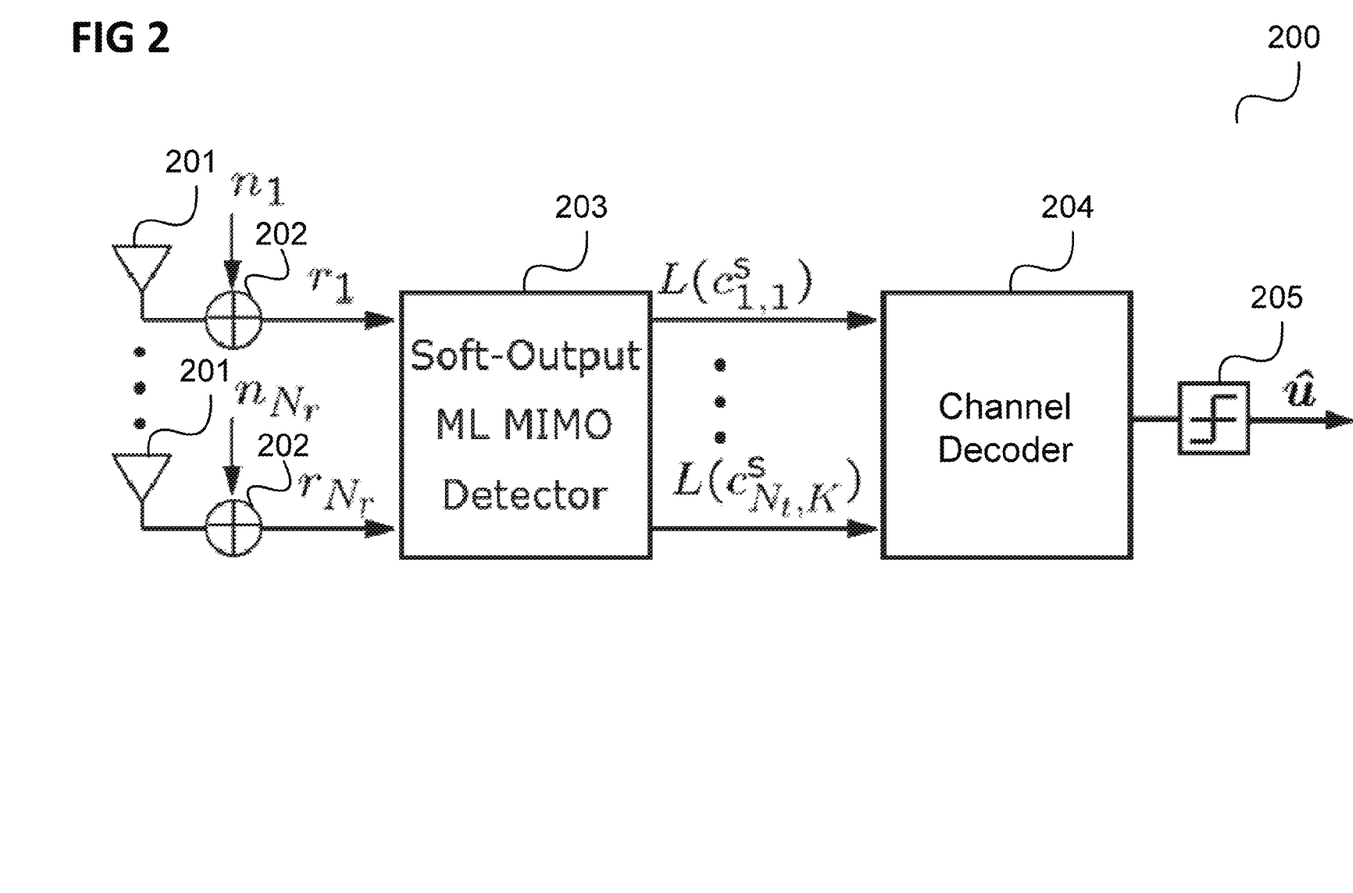
FIG. 2 shows a MIMO receiver.

A corresponding MIMO receiver is illustrated in FIG. 2.

FIG. 2 shows a receiver 200.

The signal received by the receiver can be expressed as $$r = Hx + n$$

where r (also referred to as y in the following) is an $N_r$-dimensional vector of received signals including a component for each of $N_r$ receive antennas 201 (received via the respective receive antenna 201), and n (also referred to as z in the following) is an $N_r$-vector of Gaussian noise samples. The addition of the noise is illustrated by an adder 202 for each receive antenna adding the respective noise sample $n_i$ to the received signal component $r_i$.

The receiver 200 includes a soft-output ML (maximum likelihood) detector 203 configured to generate reliability information in the form of the a posteriori log-likelihood ratio (LLR) for each bit received. The reliability information for a bit is also referred to as the soft value of the bit. Then, a soft-input/soft-output channel decoder (e.g. a turbo decoder) 204 and a decider 205 use the LLRs to recover the information bits that have been transmitted.

Performance estimation of a MIMO detector in a communication receiver is a key component in channel state estimation, whereby the channel state of a communication link between a transmitter (e.g. transmitter 100) and a receiver (e.g. receiver 200) is estimated. Such channel state estimates can be used for a variety of applications. One such application is link monitoring, whereby channel state estimates are used to help the receiver decide in choosing an appropriate transmitter to connect with. Another application is link adaptation, whereby the transmit signal is modified based on feedback of channel state estimates to enhance throughput performance.

Post-detection SINR (signal to interference and noise ratio) is a metric widely used as a detector performance measure. It can be derived in closed-form for a class of linear MIMO detectors such as zero-forcing (ZF) or minimum mean-square error (MMSE) detectors. Post-detection SINR cannot, however, be derived in closed-form for nonlinear detectors such as maximum-likelihood detection (MLD).

MLD is optimal when transmit symbols are equally likely, in the sense that it leads to minimum probability of making an erroneous symbol decision. The computational complexity of MLD in spatial multiplexing (SM) systems has exponential dependence on system parameters such as the number of MIMO transmission layers and constellation size. There exists a broad range of practical detectors that can achieve similar performance as the ideal MLD in many operation scenarios of interest, with significantly reduced computational complexities. These quasi-MLDs are often employed in commercial MIMO receivers, and, thus, it is of practical interest to have a SINR metric that can accurately and efficiently estimate the post-detection SINR of MLD and/or quasi-MLDs.

Approaches for practical estimation of l-th layer post-MLD SINR $\gamma_{l,ML}$ in MIMO SM systems with $\upsilon$ transmission layers, based on the channel (estimate) matrix H, can be classified as search-based estimation or parametric estimation.

The class of search-based estimation metrics $\gamma_{l,sb}$ is based on the observation that the MLD in Gaussian noise is a minimum distance detector. Specifically, it can be shown that $$\gamma_{l,ML} \leq \gamma_{l,sb} = \frac{d_{min,l}^2(H)}{d_{min,TX}^2 \sigma_l^2}, l \in \{0, 1, \ldots, \upsilon-1\}$$

where $$d_{min,l}^2(H) = \min_{s_{l,m} \neq s_{l,n}} \|H(s_m - s_n)\|^2$$

is the squared minimum Euclidean distance of the possible constellation points (i.e. constellation symbols), $$d_{min,TX}^2 = \min_{m \neq n} \|s_m - s_n\|^2$$

is the squared minimum Euclidean distance of the possible constellation points $s_m$, and $\sigma_l^2$ is l-th layer noise-variance of the received signal.

A receiver with the knowledge of the transmitted constellations can pre-determine $d_{min,SM}^2$. For instance, in 3GPP LTE (Long Term Evolution) systems, $d_{min,SM}^2 = 2$ for QPSK, 2/5 for 16QAM, 2/21 for 64QAM. This search for the minimum distance can be seen to be structurally similar to the maximum likelihood detection itself, except that the search for the SINR involves a pair of candidate constellation points instead of one candidate in the detection.

The above metric $\gamma_{l,sb}$ can be seen to suffer from two drawbacks. First, it is an upper bound to the ideal post-MLD SINR. Thus it is inherently an overestimate, where the amount of overestimation grows with higher channel correlation and larger number of layers. Second, it involves search space whose size exponentially increases with the number of layers and constellation size. All the tree-search techniques for reducing search space in MLD, such as depth-first search or breadth-first search (e.g. the QR-M method), can be likewise applied to reduce the search space for $\gamma_{l,sb}$. Such reductions, however, invariably increase the amount of overestimation.

Parametric estimation of post-MLD SINR takes the form of a parametric equation with one or more parameters that represent certain channel characteristics.

A channel parameter that may for example be used in MIMO channel state estimation is the set of eigenvalues $\lambda_l(H)$ of channel covariance matrix $H^H H$, which are equivalent to squared channel singular values. The notation $H^H$ denotes conjugate transpose of the matrix H. The corresponding post-MLD SINR estimator $\gamma_{l,EV}$ takes the closed-form of $$\gamma_{l,EV} = \frac{\lambda_l(H)}{\sigma_l^2}.$$

The motivation behind this parameter is based on the observation that a MIMO channel, via projection onto its eigenspace, can be viewed as a set of multiple independent SISO (single-input single-output) subchannels with eigenvalues as channel gains. This estimator is typically inaccurate, because (1) a transmitter does not necessarily precode the signal such that the received signal space forms an eigenspace and (2) a MLD does not necessarily project the received signal onto its eigenspace, since ML criterion is minimum probability-of-symbol-error criterion and is not maximum capacity criterion. Eigenvalue-based SINR estimates associated with higher $\lambda_l(H)$ tend to overestimate, while those associated with lower $\lambda_l(H)$ tend to underestimate.

An empirical estimation metric is a type of parametric estimator that employs one or more parameters whose relationship with channel observations is empirically derived. For example, channel parameters explored for the purpose of modeling post-detection performance include channel correlation (off-diagonal elements of channel covariance matrix) and symbol-error probability of other layers. Both types have been used in the context of bounds-based metric $\gamma_{l,bd}$, where a closed-form lower bound and an upper bound on post-MLD SINR is combined with a weight $\alpha$ that is a function of chosen channel parameters. For instance, $$\gamma_{l,bd} = \alpha \gamma_{l,MF} + (1-\alpha) \gamma_{l,MMSE}, 0 \leq \alpha \leq 1,$$

where $\gamma_{l,MMSE}$ is the post-MMSE SINR and $\gamma_{l,MF}$ is the SINR without cross-layer interference, i.e., $$\gamma_{l,MMSE} = \frac{h_l^H (HH^H + \sigma_l^2 I)^{-1} h_l}{1 - h_l^H (HH^H + \sigma_l^2 I)^{-1} h_l},$$

and $$\gamma_{l,MF} = \frac{\|h_l\|^2}{\sigma_l^2} = \sum_{k=0}^{\upsilon-1} \frac{|h_{kl}|^2}{\sigma_k^2},$$

where $h_{kl}$ denotes the k-th row, l-th column element of H, $h_l$ denotes l-th column vector of H, and I denotes identity matrix. Thus $\gamma_{l,MMSE}$ acts as a lower bound and $\gamma_{l,MF}$ acts as an upperbound.

The chief difficulty of this approach can be seen to lie in the formulation of the equation in terms of the channel parameters, i.e. the derivation of the relationship between the parameter (e.g. $\alpha$) and channel characteristics. Computationally efficient functions of channel correlation or symbol-error probability can be empirically deduced for 2-layer MIMO SM systems, but the dimension of such functions increases with the number of layers and can for example become impractical with four or more layers. In the channel correlation method, the number of off-diagonal elements of channel covariance matrix is $\Sigma_{n=1}^{\upsilon-1} n$, thus in a 2-, 4-, or 8-layer system, $\alpha$ is a function of 1, 6, or 28 input parameters, respectively. In the symbol-error probability method, the associated function depends on $\upsilon-1$ per-layer error probability values as well as $\upsilon-1$ modulation orders, thus in a 2-, 4-, or 8-layer system, $\alpha$ is a function of 2, 6, or 14 input parameters, respectively.

In the following, an approach for estimating a MIMO channel quality (in other words communication performance) when using a certain detection method is described, e.g. for estimating maximum-likelihood detector (MLD) performance in a multiple-input multiple-output (MIMO) communication system. Specifically, for example, a class of per-layer post-detection signal-to-interference-and-noise ratio (SINR) metrics are described that can accurately and efficiently model MLD performance in MIMO spatial multiplexing (SM) systems with multiple transmission layers.

Figure 3:
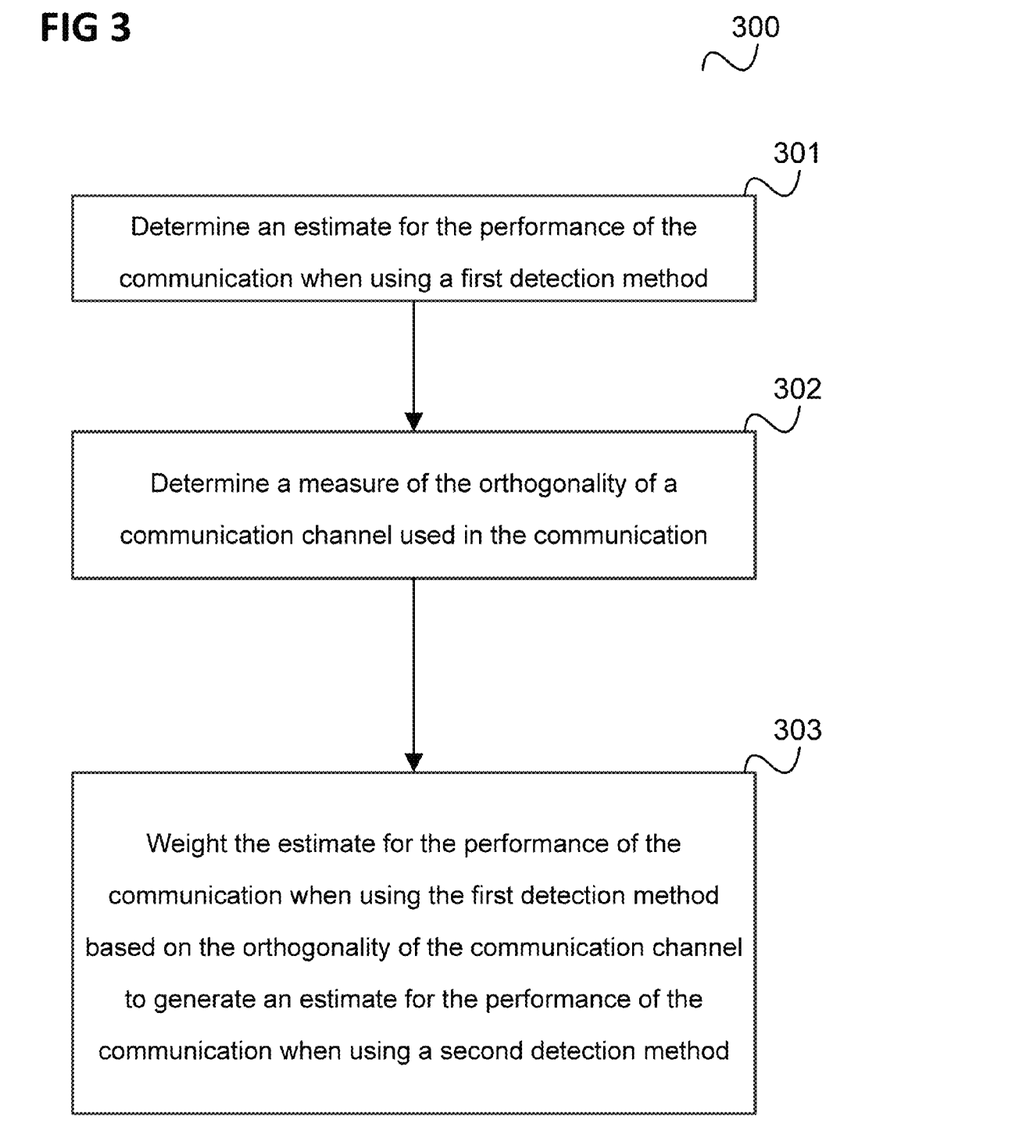
FIG. 3 shows a flow diagram illustrating a method for determining a quality of a MIMO communication channel.

FIG. 3 shows a flow diagram 300 illustrating a method for determining a quality of a MIMO communication channel, for example carried out by a communication device.

In 301, the communication device determines an estimate for the performance of the communication when using a first detection method.

In 302, the communication device determines a measure of the orthogonality of a communication channel used in the communication.

In 303, the communication device weights the estimate for the performance of the communication when using the first detection method based on the orthogonality (e.g. depending on the orthogonality of the communication channel) of the communication channel to generate an estimate for the performance of the communication when using a second detection method.

In other words, a first estimate of the communication performance (or, in other words, detection performance) for a first detection method, e.g. an estimate that is relatively simple to calculate, is determined and based on this first estimate, a second estimate of the communication performance for a second detection method is determined taking into account the orthogonality of the communication channel that is used.

The first detection method is for example a detection method for which a communication performance is relatively easy to determine. For example, a closed-form performance estimate exists for the first detection method. For example, the first detection method is a linear detection method. The second detection method is for example a detection method for which a communication performance is relatively hard to determine. For example, the second detection method is a nonlinear detection method.

Figure 4:
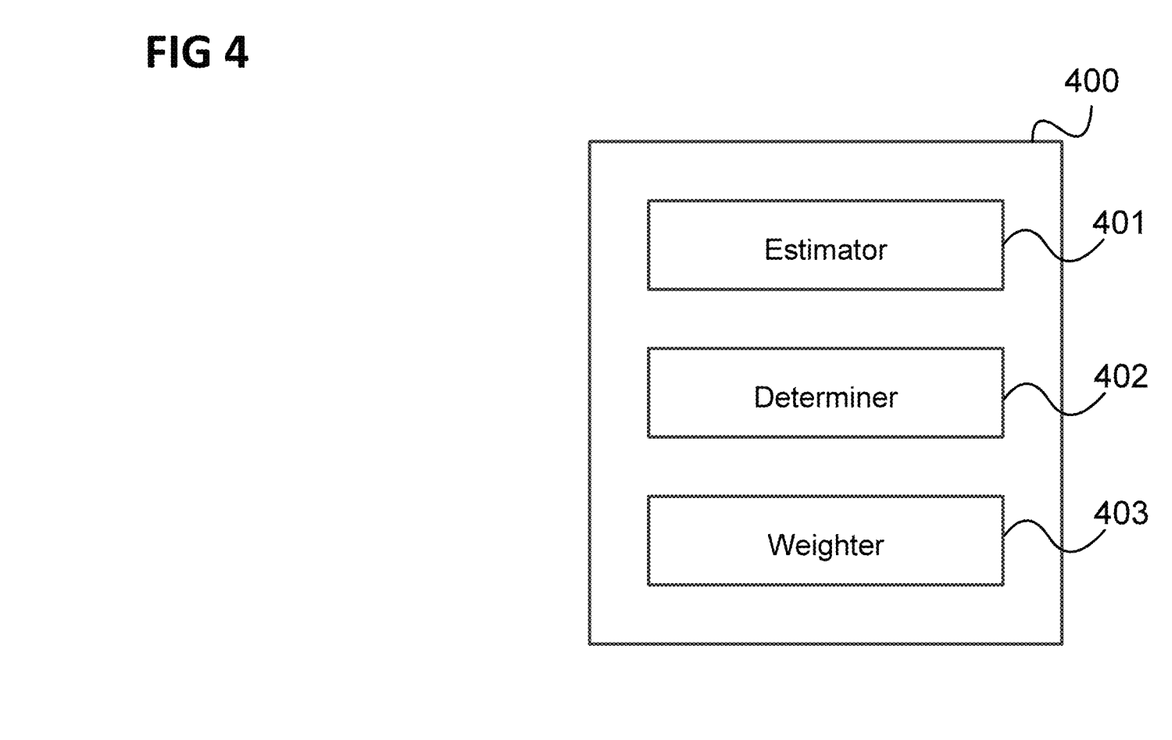
FIG. 4 shows a communication device.

The method illustrated in FIG. 3 is for example carried out by a communication device as illustrated in FIG. 4.

FIG. 4 shows a communication device 400.

The communication device 400 includes an estimator configured to determine an estimate for the performance of the communication when using a first detection method, a determiner configured to determine a measure of the orthogonality of a communication channel used in the communication and a weighter configured to weight the estimate for the performance of the communication when using the first detection method based on the orthogonality of the communication channel to generate an estimate for the performance of the communication when using a second detection method.

The communication device for example acts as the receiver of the MIMO communication. It may be a communication terminal or a component of a communication network such as a base station.

The components of the communication device (e.g. the determiner, the estimator and the weighter) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

The following examples pertain to further embodiments.

Example 1 is a method for determining a performance of a MIMO communication as illustrated in FIG. 3.

In Example 2, the subject matter of Example 1 can further include determining an estimate for transmission characteristics of the communication channel.

In Example 3, the subject matter of Example 2 can include determining the measure of the orthogonality based on the estimate for transmission characteristics of the communication channel.

In Example 4, the subject matter of any one of Examples 2-3 can further include the estimate for transmission characteristics of the communication channel being a channel matrix and determining the measure of the orthogonality of the communication channel comprising determining a measure of the orthogonality of the channel matrix.

In Example 5, the subject matter of any one of Examples 1-4 can further include the measure of the orthogonality being the orthogonality defect or Seysen's measure.

In Example 6, the subject matter of any one of Examples 1-5 can further include the performance of the second detection method based on the orthogonality of the channel In Example 7, the subject matter of any one of Examples 1-6 can further include the second detection method being maximum-likelihood detection or a variant that is based on the maximum-likelihood criterion.

In Example 8, the subject matter of any one of Examples 1-7 can further include the estimate for the performance of the communication when using the first detection method being a lower bound for the performance of the communication when using the second detection method.

In Example 9, the subject matter of any one of Examples 1-8 can further include the first detection method being a linear detection method.

In Example 10, the subject matter of Example 9 can further include the first detection method being zero-forcing detection or MMSE detection.

In Example 11, the subject matter of any one of Examples 1-10 can further include the performance of the second detection method improving with the orthogonality of the communication channel and weighting the estimate for the performance of the communication when using the first detection method comprising changing the estimate for the performance of the communication when using the first detection method to indicate a higher performance according to the benefit of the orthogonality of the communication channel to the performance of the communication when using the second detection method.

In Example 12, the subject matter of any one of Examples 1-11 can further include the estimate for the performance of the communication when using the first detection method being an upper bound for the performance of the communication when using the second detection method.

In Example 13, the subject matter of any one of Examples 1-12 can further include the first detection method being a lattice-reduction-aided linear detection method.

In Example 14, the subject matter of any one of Examples 1-13 can further include determining an estimate for transmission characteristics of the communication channel in a lattice-reduced domain.

In Example 15, the subject matter of any one of Examples 1-14 can further include mapping the estimate for the performance of the communication when using the first detection method to an original domain to generate the estimate for the performance of the communication when using the second detection method.

In Example 16, the subject matter of Example 15 can further include the original domain being the domain in which the MIMO communication is carried out.

In Example 17, the subject matter of any one of Examples 1-16 can further include the performance of the second detection method worsening with the defect of orthogonality of the communication channel and weighting the estimate for the performance of the communication when using the first detection method comprising changing the estimate for the performance of the communication when using the first detection method to indicate a lower performance according to the defect of the orthogonality of the communication channel to the performance of the communication when using the second detection method.

Example 18 is a computer readable medium having recorded instructions thereon which, when executed by a processor, make the processor perform a method for determining a performance of a MIMO communication according to any one of Examples 1 to 17.

Example 19 is a communication device as illustrated in FIG. 4.

In Example 20, the subject matter of Example 19 can further include a channel estimator configured to determine an estimate for transmission characteristics of the communication channel.

In Example 21, the subject matter of Example 20 can further include the determiner being configured to determine the measure of the orthogonality based on the estimate for transmission characteristics of the communication channel.

In Example 22, the subject matter of any one of Examples 20-21 can further include the estimate for transmission characteristics of the communication channel being a channel matrix and the determiner being configured to determine the measure of the orthogonality of the communication channel by determining a measure of the orthogonality of the channel matrix.

In Example 23, the subject matter of any one of Examples 19-22 can further include the measure of the orthogonality being the orthogonality defect or Seysen's measure.

In Example 24, the subject matter of any one of Examples 19-23 can further include the performance of the second detection method based on the orthogonality of the channel.

In Example 25, the subject matter of any one of Examples 19-24 can further include the second detection method being maximum-likelihood detection or a variant that is based on the maximum-likelihood criterion.

In Example 26, the subject matter of any one of Examples 19-25 can further include the estimate for the performance of the communication when using the first detection method being a lower bound for the performance of the communication when using the second detection method.

In Example 27, the subject matter of any one of Examples 19-26 can further include the first detection method being a linear detection method.

In Example 28, the subject matter of Example 27 can further include the first detection method being zero-forcing detection or MMSE detection.

In Example 29, the subject matter of any one of Examples 19-28 can further include the performance of the second detection method improving with the orthogonality of the communication channel and the weighter being configured to weight the estimate for the performance of the communication when using the first detection method by changing the estimate for the performance of the communication when using the first detection method to indicate a higher performance according to the benefit of the orthogonality of the communication channel to the performance of the communication when using the second detection method.

In Example 30, the subject matter of any one of Examples 19-29 can further include the estimate for the performance of the communication when using the first detection method being an upper bound for the performance of the communication when using the second detection method.

In Example 31, the subject matter of any one of Examples 19-30 can further include the first detection method being a lattice-reduction-aided linear detection method.

In Example 32, the subject matter of any one of Examples 19-31 can further include a channel estimator configured to determine an estimate for transmission characteristics of the communication channel in a lattice-reduced domain.

In Example 33, the subject matter of any one of Examples 19-32 can further include a mapper configured to map the estimate for the performance of the communication when using the first detection method to an original domain to generate the estimate for the performance of the communication when using the second detection method.

In Example 34, the subject matter of Example 33 can further include the original domain being the domain in which the communication device carries out the MIMO communication.

In Example 35, the subject matter of any one of Examples 19-34 can further include the performance of the second detection method worsening with the defect of orthogonality of the communication channel and the weighter being configured to weight the estimate for the performance of the communication when using the first detection method by changing the estimate for the performance of the communication when using the first detection method to indicate a lower performance according to the defect of the orthogonality of the communication channel to the performance of the communication when using the second detection method.

Example 36 is a communication device comprising estimating means for determining an estimate for the performance of the communication when using a first detection method; determining means for determining a measure of the orthogonality of a communication channel used in the communication and weighting means for weighting the estimate for the performance of the communication when using the first detection method based on the orthogonality of the communication channel to generate an estimate for the performance of the communication when using a second detection method.

In Example 37, the subject matter of Examples 36 can further include channel estimating means for determining an estimate for transmission characteristics of the communication channel.

In Example 38, the subject matter of Example 37 can further include the determining means being for determining the measure of the orthogonality based on the estimate for transmission characteristics of the communication channel.

In Example 39, the subject matter of any one of Examples 37-38 can further include the estimate for transmission characteristics of the communication channel being a channel matrix and the determining means being for determining the measure of the orthogonality of the communication channel by determining a measure of the orthogonality of the channel matrix.

In Example 40, the subject matter of any one of Examples 36-39 can further include the measure of the orthogonality being the orthogonality defect or Seysen's measure.

In Example 41, the subject matter of any one of Examples 36-40 can further include the performance of the second detection method depending on the orthogonality of the channel.

In Example 42, the subject matter of any one of Examples 36-41 can further include the second detection method being maximum-likelihood detection or a variant that is based on the maximum-likelihood criterion.

In Example 43, the subject matter of any one of Examples 36-42 can further include the estimate for the performance of the communication when using the first detection method being a lower bound for the performance of the communication when using the second detection method.

In Example 44, the subject matter of any one of Examples 36-43 can further include the first detection method being a linear detection method.

In Example 45, the subject matter of Example 44 can further include the first detection method being zero-forcing detection or MMSE detection.

In Example 46, the subject matter of any one of Examples 36-44 can further include the performance of the second detection method improving with the orthogonality of the communication channel and the weighting means being for weighting the estimate for the performance of the communication when using the first detection method by changing the estimate for the performance of the communication when using the first detection method to indicate a higher performance according to the benefit of the orthogonality of the communication channel to the performance of the communication when using the second detection method.

In Example 47, the subject matter of any one of Examples 36-46 can further include the estimate for the performance of the communication when using the first detection method being an upper bound for the performance of the communication when using the second detection method.

In Example 48, the subject matter of any one of Examples 36-47 can further include the first detection method being a lattice-reduction-aided linear detection method.

In Example 49, the subject matter of any one of Examples 36-48 can further include a channel estimating means for determining an estimate for transmission characteristics of the communication channel in a lattice-reduced domain.

In Example 50, the subject matter of any one of Examples 36-49, can further include a mapping means for mapping the estimate for the performance of the communication when using the first detection method to an original domain to generate the estimate for the performance of the communication when using the second detection method.

In Example 51, the subject matter of Example 50 can further include the original domain being the domain in which the communication device carries out the MIMO communication.

In Example 52, the subject matter of any one of Examples 36-51 can further include the performance of the second detection method worsening with the defect of orthogonality of the communication channel and the weighting means being for weighting the estimate for the performance of the communication when using the first detection method by changing the estimate for the performance of the communication when using the first detection method to indicate a lower performance according to the defect of the orthogonality of the communication channel to the performance of the communication when using the second detection method.

It should be noted that one or more of the features of any of the examples above may be combined with any one of the other examples.

In the following, examples are described in more detail.

As a first example, a parametric closed-form estimator of per-layer post-MLD SINR in MIMO SM systems is described which can be seen to be based on the observation that the performance gain of MLD relative to linear detections depends on the degree of orthogonality of the channel. A single measure of the channel orthogonality, regardless of the channel matrix dimension, can capture sufficient information on the relative performance gain. Thus, in this example, an efficient post-MLD SINR estimator is described that involves only one closed-form linear-detector SINR as a lower bound and a function of the single channel orthogonality parameter that models the MLD performance gain.

With this estimator (i.e. with this channel performance estimation method) according to this example, comparable accuracy as the most accurate post-MLD SINR estimators can be achieved, but with less computational complexity.

The estimator $\gamma_{l,bd}$, based on a weighted combining of lower- and upper bounds as described above, can offer efficient and sufficiently accurate SINR estimate for a given 2-layer MIMO SM system. This is a relatively efficient technique among practical methods, since the more efficient eigenvalue-based estimator is inaccurate. Achieving a level of accuracy sufficient for a given system requirement with this estimator, however, involves extensive offline simulations and calibrations for preparing an adequate function that maps channel parameters to the weight in the SINR equation, and the function is not in closed-form. Moreover, the dimension of this function increases with the number of MIMO layers, making the formulation of the function impractical with larger number of layers.

The estimator of the present example can be seen as a combination of a closed-form lower bound and a closed-form function of a measure of channel orthogonality. It is more efficient than the $\gamma_{l,bd}$ described above in the sense that (1) it does not need the computation of an upperbound, (2) it depends on a single channel parameter regardless of the number of layers, and (3) the dependency can be modeled in a closed-form equation without offline simulations or calibrations. The independence from the number of layers can be seen as a particular strength.

According to the present example, a class of per-layer post-detection SINR metrics that can accurately and efficiently model MLD or quasi-MLD performance in MIMO SM systems is provided by combining a post-linear-detection SINR and a function of a channel orthogonality parameter. The post-linear-detection SINR serves as a lower bound to post-MLD SINR, and the function of a channel orthogonality parameter models the performance gain of MLD relative to the linear detector used for the lower bound.

Specifically, the l-th layer post-MLD SINR for an υ-layer MIMO SM system is for example in the form of $$\gamma_{l,ML} = f(\xi(H)) \cdot \gamma_{l,LB}, \ l \in \{0,1,\ldots,\upsilon-1\},$$

where $f(x)$ denotes a function of variable x, $\xi(H)$ denotes a measure of orthogonality of the channel matrix H, and $\gamma_{l,LB}$ denotes a closed-form post-detection SINR of a suboptimal detector, used as the lower bound, e.g. determined according to the equations given above.

Any closed-form post-detection SINR of a suboptimal linear detector can be used as the lower bound $\gamma_{l,LB}$, and the function $f(\cdot)$ may be chosen depending on the choice of the detector. A desirable choice may be the post-MMSE SINR $\gamma_{l,MMSE}$ as described above, since it behaves well with respect to channel singularity.

The measure of channel orthogonality $\xi(H)$ is for example chosen such that it monotonically depends on how close the set of channel basis vectors is to an orthogonal set. Measures with this characteristic include the orthogonality defect and Seysen's measure. The orthogonality defect is defined as $$\delta(H) = \frac{\prod_{k=1}^{v-1} \|h_k\|}{\sqrt{\det(H^H H)}},$$

where det(A) denotes the determinant of matrix A. This orthogonality defect amounts to the ratio of the product of lengths of basis vectors and the volume of parallelepiped formed by the basis vectors. The column vectors $h_k$ can be viewed as a basis for an $\upsilon$-dimensional lattice, and in this context, the denominator $\sqrt{\det(H^H H)}$ represents the volume of a fundamental cell of this lattice.

Seysen's measure is defined as $$S(H) = \sum_{k=0}^{v-1} \|h_k\|^2 \|h_k^\#\|^2,$$

where $h_k^\#$ is k-th column vector of $H^{\#H}$, such that $H^{\#H}H=I$, an identity matrix. Thus $H^{\#H}$ is a dual basis and $h_k^\#$ is a basis vector of the dual lattice. Both $\delta(H)$ and $S(H)$ reach their respective minimum values if and only if the channel H is orthogonal.

The function $f(\cdot)$ is for example chosen depending on the type of detector assumed for the lower bound as well as on the channel orthogonality metric. For the case of $\gamma_{l,LB} = \gamma_{l,MMSE}$ and $\xi(H) = \delta(H)$, a desirable choice may for example be $$f(x) = x^{1/\kappa\upsilon},$$

where the value $\kappa$ can be adjusted according to the type of quasi-MLD assumed for the $\gamma_{l,ML}$ estimate. For a broad range of sphere detectors with tree-pruning techniques, $\kappa=2$ may for example be a desirable choice.

An example for an estimator of the first example described above is illustrated in FIG. 5.

Figure 5:
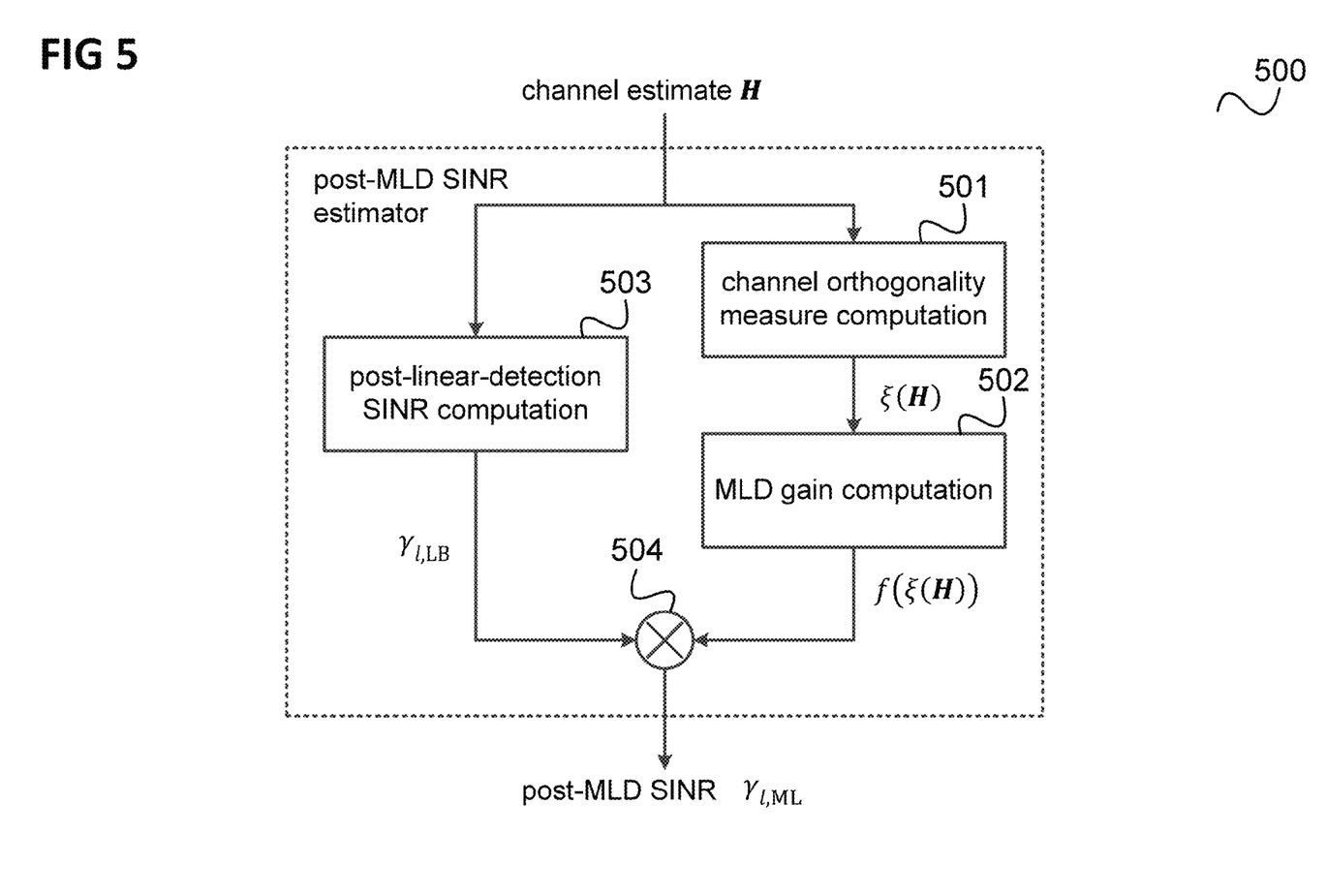
FIG. 5 shows an estimator carrying out an estimating method according to a post-MLD SINR estimator for a MIMO spatial multiplexing (SM) system according to a first example.

FIG. 5 shows an estimator 500.

The estimator 500 carries out an estimating method according to a post-MLD SINR estimator for a MIMO SM system.

The estimator 500 includes an orthogonality computation block 501 which computes a channel orthogonality measure $\xi(H)$, e.g. based on an estimate of the channel matrix H as an input for the estimator 500, e.g. provided by a channel estimator.

The estimator 500 further includes a gain computation block 502 which determines an MLD gain $f(\xi(H))$ based on the measure of the channel orthogonality.

The estimator 500 further includes a linear detection performance block 503 which computes a post-linear-detection SINR $\gamma_{l,LB}$.

The estimator 500 further includes a multiplier 504 which weights the post-linear-detection SINR with the MLD gain, i.e. multiplies it with the MLD gain in this example, to generate the post-MLD SINR $\gamma_{l,ML}$.

The various blocks 501 to 503 and the multiplier 504 may for example be implemented by one or more circuits, e.g. processors.

For $\kappa=2$ the estimated post-MLD SINR for an $\upsilon$-layer MIMO SM system is for example given as $$\gamma_{l,ML} = (\epsilon(H))^{1/2\upsilon} \cdot \gamma_{l,MMSE},$$

which embodies the ideas described herein.

In this case, the orthogonality defect $\delta(H)$ is computed by the orthogonality computation block 501, $(\cdot)^{1/2\upsilon}$ is performed by the gain computation block 502, and $\gamma_{l,MMSE}$ is computed by the linear detection performance block 503.

The function $f(x) = x^{1/\kappa\upsilon}$ for any integer $\kappa$ and $\upsilon$ can for example be implemented as a compact finite-precision tabular mapping. As the above example suggests, the proposed post-MLD SINR estimator indeed requires only a single channel parameter in addition to a closed-form equation, regardless of the number of MIMO layers.

The estimator according to the first example can be empirically shown to provide CSI estimates for a class of sphere detectors, such that in a range of multipath profiles, Doppler spreads, channel correlations, and antenna configurations, it leads to consistently better performance than classical MMSE-SINR estimation methods.

In summary, the first example as described above can be seen to be an apparatus or method for estimating post-detection performance of an MLD or a quasi-MLD in MIMO SM systems that utilizes a post-detection SINR expression of a linear detector and a factor that represents the performance gain of the said MLD or quasi-MLD relative to the said linear detector wherein a measure of orthogonality of the channel is used as an input parameter for computing the said MLD performance gain over the linear detector.

As a second example, a parametric closed-form estimator of per-layer post-MLD SINR in MIMO SM systems is described in the following which can be seen to be based on the observation that there exists a class of suboptimal detectors that (1) provides consistently better performance than the MMSE detector, (2) offers closed-form post-detection SINR expression, and (3) leads to the same asymptotic BLER (block error rate) slope as MLD. Specifically, the present example can be seen to exploit the class of lattice-reduction-aided (LRA) linear detectors, where a unimodular transformation is applied to channel estimate matrix to obtain a transformed channel. In this lattice-reduced (transformed) domain, closed-form per-layer post-detection SINR can be derived. The above condition (3), in particular, implies that the post-LRA-detection SINR amounts to a constant shift from the ideal $\gamma_{l,ML}$.

The estimator of the present example can offer the following benefits over the known post-MLD SINR estimators. First, the lattice-reduction-based SINR estimator can achieve comparable accuracy as the empirical estimators such as the bounds-based metric $\gamma_{l,bd}$, without empirical calibrations. Also, it scales well with the number of MIMO layers. Second, the estimator is significantly more efficient than the search-based estimators $\gamma_{l,sb}$ and does not suffer from inherent overestimation. Finally, the estimator does not face the inaccuracy issues of the eigenvalue-based estimator $\gamma_{l,EV}$.

According to the present example, a class of per-layer post-detection SINR metrics that can accurately and efficiently model MLD or quasi-MLD performance in MIMO SM systems is constructed by exploiting key characteristics of the class of lattice-reduction-aided (LRA) linear detectors. Specifically, the LRA linear detectors (1) provide consistently better performance than the corresponding linear detectors without lattice reduction, (2) are amenable to closed-form post-detection SINR expressions, and (3) lead to the same asymptotic BLER slope as MLD. These characteristics imply that the post-LRA-detection SINR metrics can be utilized as a basis for practical post-MLD SINR estimators with constant offset from the ideal SINR.

In LRA detection (LRAD), a channel estimate matrix is lattice basis reduced to a nearly orthogonal basis. In other words, the basis spanning the channel estimate matrix H is de-skewed, such that the lattice-reduced (transformed) channel estimate matrix consists of "almost" orthogonal basis vectors. To help elucidate this lattice reduction in a mathematical framework, the $\upsilon$-layer MIMO system is modeled as above as $$y = Hx + z,$$

where y is the $\upsilon \times 1$ received signal vector, H is the $\upsilon \times \upsilon$ channel matrix, x is the $\upsilon \times 1$ transmitted signal vector, and z is the $\upsilon \times 1$ noise vector, with l-th layer variance of $\sigma_l^2$. This model can also be formulated as $$y = HTT^{-1}x + z = \acute{H}T^{-1}x + z,$$

where $\acute{H} = HT$. The diacritic accent is used to denote values in the lattice-reduced (transformed) domain hereafter. In this framework, the lattice reduction problem can be defined as finding a unimodular transformation T with the associated orthogonality defect $\delta(\acute{H}) \leq c$, where c is some constant and $$\delta(A) = \frac{\prod_k \|a_k\|}{\sqrt{\det(A^H A)}},$$

where det(B) denotes the determinant of matrix B. There exist polynomial-time algorithms for finding a suitable transformation T and the lattice-reduced channel $\acute{H}$, such as Lenstra-Lenstra-Lovász (LLL) algorithm.

A linear detection in the lattice-reduced domain offers the following: First, its performance is better than or equal to that of the same linear detection in the original domain, and can closely mimic the MLD performance. This is because the performance of a linear detection approaches that of the MLD as the channel matrix approaches an orthogonal matrix. In particular, LRA linear detectors achieve the maximum degree of diversity and, hence, lead to the same asymptotic BLER slope as MLD. Second, a linear detection is amenable to closed-form per-layer post-detection SINR expression $\acute{\gamma}_{l,LRAD}$ in the lattice-reduced domain. For instance, in the case of LRA-ZF (zero-forcing) detector, the per-layer SINR in the transformed domain is $$\acute{\gamma}_{l,LRAD} = \acute{\gamma}_{l,LRA-ZF} = \frac{1}{\sigma_l^2 \left[ \left( \acute{H}^H \acute{H} \right)^{-1} \right]_{l,l}}$$

where the notation $[A]_{l,l}$ denotes the l-th row, l-th column element (l-th diagonal element) of matrix A.

Representation of post-MLD performance with post-LRAD SINR is not entirely straightforward due to two issues. First, in finite constellation, a decision in the lattice-reduced domain may not map to a valid constellation symbol in the original domain. Thus, the above $\gamma_{l,LRAD}$ is exact only in infinite constellation. Second, the mapping of the set of per-layer SINRs in the transformed domain to its counterpart in the original domain is unclear. One heuristic mapping option is to utilize per-layer MMSE-SINR as weighting factors, i.e., $$\alpha_l = \frac{\gamma_{l,MMSE}}{\Sigma_k \gamma_{k,MMSE}}$$

and define the post-LRAD SINR in the original domain as $$\gamma_{l,LRAD} = \alpha_l \acute{\gamma}_{l,LRAD},$$

where $$\acute{\gamma}_{l,LRAD} = \sum_k \acute{\gamma}_{k,LRAD}.$$

In practice, a third issue arises. Many communication systems, for complexity reasons, employ suboptimal fixed-point quasi-MLD such as sphere detector with various tree-pruning techniques rather than the ideal MLD. As the channel becomes less orthogonal, the suboptimality of such practical quasi-MLDs increases, and the $\gamma_{l,ML}$ based on LRA detection can overestimate the performance of the actual quasi-MLD.

To address these issues, according to the present example, a parametric post-MLD SINR metric is constructed based on post-LRA-detection SINR, such that the metric can accurately estimate the post-detection SINR of the actual quasi-MLD employed for a given MIMO system. Specifically, the proposed metric introduces a debiasing step on the post-LRA-detection SINR, where the debiasing factor depends on a measure of the degree of orthogonality of the channel before lattice reduction. One desirable measure is the orthogonality defect of the channel. That is, $$\acute{\gamma}_{ML} = g(\delta(H)) \acute{\gamma}_{LRAD},$$

where $g(\delta(H))$ denotes a monotonically decreasing function of $\delta(H)$ and $$\delta(H) = \frac{\prod_k \|h_k\|}{\sqrt{\det(H^H H)}}.$$

This choice of the orthogonality defect of the channel as the sole parameter for deducing appropriate debiasing factor is based on the observation that the degree of suboptimality of quasi-MLDs tends to increase with larger orthogonality defect of the channel.

The function $g(\delta(H))$ can be selected to reflect the choice of actual quasi-MLD employed. A desirable choice may for example be $$g(\delta(H)) = \frac{1}{(\delta(H))^{1/\nu}}.$$

The debiased post-LRAD SINR in the transformed domain is mapped back to the original domain to obtain the per-layer post-MLD SINR suitable for quasi-MLDs, i.e., $$\gamma_{l,ML} = \alpha_l \acute{\gamma}_{ML},$$

where the weight $\alpha_l$ can be obtained, for example, via MMSE-SINR, e.g.

$$\alpha_l = \frac{\gamma_{l,MMSE}}{\Sigma_k \gamma_{k,MMSE}}.$$

The debiasing step and the mapping step to the original domain are both multiplications, thus the two steps are commutative and their order can be interchanged.

An example for an estimator of the second example described above is illustrated in FIG. 6.

Figure 6:
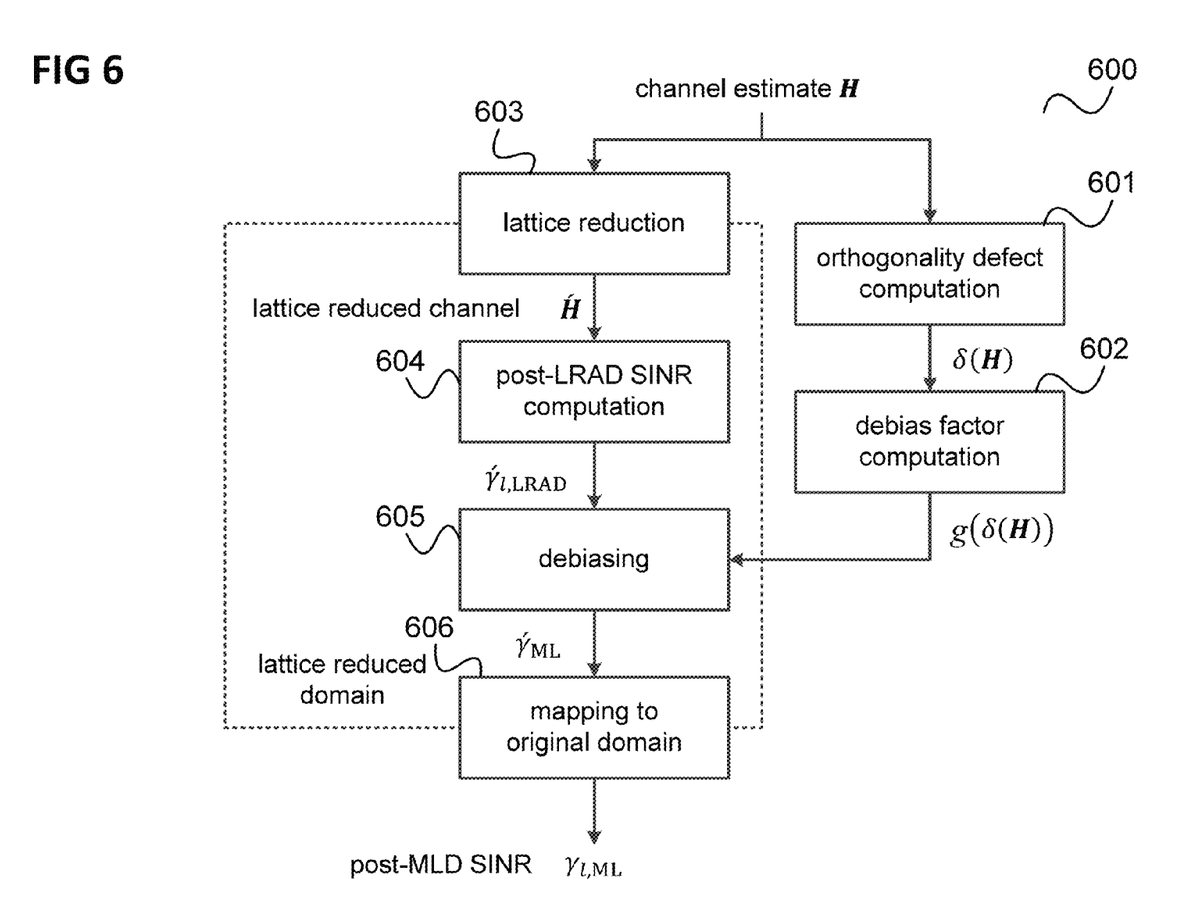
FIG. 6 shows an estimator carrying out an estimating method according to a post-MLD SINR estimator for a MIMO SM system according to a second example.

FIG. 6 shows an estimator 600.

The estimator 600 carries out an estimating method according to a post-MLD SINR estimator for a MIMO SM system.

The estimator 600 includes an orthogonality computation block 501 which computes a channel orthogonality measure $\xi(H)$, equal to the orthogonality defect $\delta(H)$ in this example, e.g. based on an estimate of the channel matrix H as an input for the estimator 600, e.g. provided by a channel estimator.

The estimator 600 further includes a gain computation block 502 which determines a debiasing factor $g(\delta(H))$ based on the measure of the channel orthogonality, i.e. the orthogonality defect in this example.

The estimator 600 further includes a lattice reduction block 603 which generates the lattice-reduced channel matrix $\tilde{H}$ from the channel matrix H, a post-LRAD SINR computation block 604 which determines the per-layer post-detection SINR $\gamma_{l,LRA}$ in the transformed domain and a debiasing block 605 which determines the estimate $\hat{\gamma}_{ML}$ of the post-MLD SINR in the transformed domain according to $\hat{\gamma}_{ML} = g(\delta(H))\hat{\gamma}_{LRAD}$.

A mapping block 606 maps this estimate to the original domain to generate the post-MLD SINR $\gamma_{l,ML}$.

The various blocks 601 to 606 may for example be implemented by one or more circuits, e.g. processors.

As described above, the order of the debiasing by 605 and the mapping to original domain by 606 can be changed. It should be noted that the metric $\gamma_{l,ML}$ requires no empirical calibration, and scales well with the number of MIMO layers $\upsilon$.

The estimator according to the second example (based on LRA-ZF with the example choice of $g(\delta(H))$) can be empirically shown to provide CSI estimates for a class of sphere detectors, such that in a range of multipath profiles, Doppler spreads, channel correlations, and antenna configurations, it leads to consistently better performance than the classical MMSE-SINR.

In summary, the second example as described above can be seen to be an apparatus or method for estimating post-detection performance of an MLD or a quasi-MLD in MIMO SM systems that utilizes a post-detection SINR expression of a lattice-reduction-aided detector and applies a debiasing step to the post-LRAD SINR where the debiasing factor monotonically depends on a measure of the degree of orthogonality of the channel.

Figure 7:
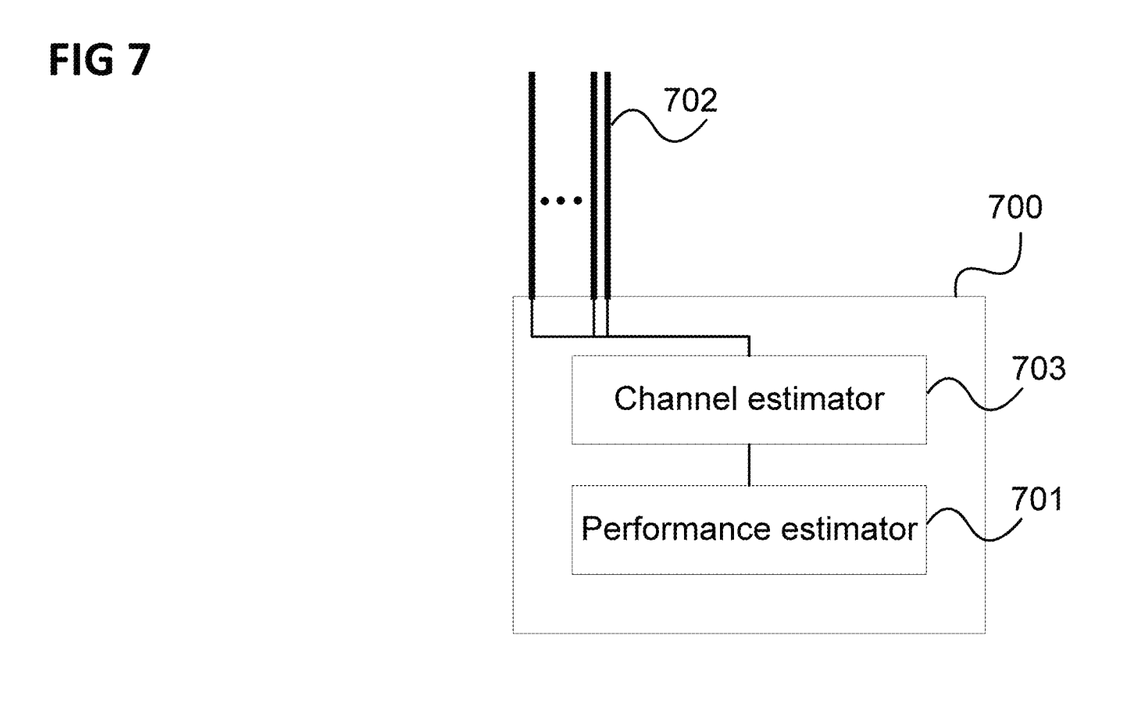
FIG. 7 illustrates an example of a mobile communication device 700 including a post-detection performance estimator.

FIG. 7 illustrates an example of a mobile communication device 700 including an post-detection performance estimator.

The mobile communication device 700, for example a mobile phone, includes an performance estimator 701 for estimating post-detection performance of an MLD or a quasi-MLD in a MIMO SM systems.

The performance estimator 701 receives a channel estimation from a channel estimator 703 which estimates the channel based on signals received via a plurality of receive antennas 702. The performance estimator 701 for example corresponds to the estimator 500 or the estimator 600 and estimates a post-MLD SINR based on the channel estimate as described above with reference to FIG. 5 or 6.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A method for determining a performance of a multiple-input multiple-output (MIMO) communication comprising:
    determining, using a circuit, an estimate for a signal to interference and noise ratio (SINR) of the MIMO communication when using a first detection method;
    determining, using the circuit, a measure of an orthogonality of a communication channel used in the MIMO communication; and
    generating, using the circuit, a further estimate for the SINR of the MIMO communication when using a second detection method different from the first detection method by weighting the estimate for the SINR of the MIMO communication when using the first detection method with a debiasing factor calculated based on the orthogonality of the communication channel.

2. The method according to claim 1, further comprising determining an estimate for transmission characteristics of the communication channel.

3. The method according to claim 2, comprising determining the measure of the orthogonality based on the estimate for transmission characteristics of the communication channel.

4. The method according to claim 2, wherein the estimate for transmission characteristics of the communication channel is a channel matrix and determining the measure of the orthogonality of the communication channel comprises determining a measure of the orthogonality of the channel matrix.

5. The method according to claim 1, wherein the measure of the orthogonality is an orthogonality defect or a Seysen's measure.

6. The method according to claim 1, wherein the performance of the second detection method is based on the orthogonality of the channel.

7. The method according to claim 1, wherein the second detection method is a maximum-likelihood detection or a variant that is based on the maximum-likelihood criterion.

8. The method according to claim 1, wherein the estimate for the performance of the MIMO communication when using the first detection method is a lower bound for the performance of the MIMO communication when using the second detection method.

9. The method according to claim 1, wherein the first detection method is a linear detection method.

10. The method according to claim 9, wherein the first detection method is a zero-forcing detection or an MMSE detection.

11. The method according to claim 1, wherein the performance of the second detection method improves with the orthogonality of the communication channel and weighting the estimate for the performance of the MIMO communication when using the first detection method comprises changing the estimate for the performance of the MIMO communication when using the first detection method to indicate a higher performance according to a benefit of the orthogonality of the communication channel to the performance of the MIMO communication when using the second detection method.

12. The method according to claim 1, wherein the estimate for the performance of the MIMO communication when using the first detection method is an upper bound for the performance of the MIMO communication when using the second detection method.

13. The method according to claim 1, wherein the first detection method is a lattice-reduction-aided linear detection method.

14. The method according to claim 1, further comprising determining an estimate for transmission characteristics of the communication channel in a lattice-reduced domain.

15. The method according to claim 1, further comprising mapping the estimate for the performance of the MIMO communication when using the first detection method to an original domain to generate the estimate for the performance of the MIMO communication when using the second detection method.

16. The method according to claim 15, wherein the original domain is a domain in which the MIMO communication is carried out.

17. The method according to claim 1, wherein the performance of the second detection method worsens with a defect of orthogonality of the communication channel and weighting the estimate for the performance of the MIMO communication when using the first detection method comprises changing the estimate for the performance of the MIMO communication when using the first detection method to indicate a lower performance according to the defect of the orthogonality of the communication channel to the performance of the MIMO communication when using the second detection method.

18. A computer readable non-transitory medium having recorded instructions thereon which, when executed by a processor, make the processor perform a method for determining a performance of a MIMO communication according to any one of claims 1 to 17.

19. Communication device comprising:
   an estimator configured to determine an estimate for a signal to interference and noise ratio (SINR) of the communication when using a first detection method;
   a determiner configured to determine a measure of an orthogonality of a communication channel used in the communication; and
   a weighter configured to weight the estimate for the SINR of the communication when using the first detection method with a debiasing factor calculated based on the orthogonality of the communication channel to generate a further estimate for the SINR of the communication when using a second detection method different from the first detection method.

20. The communication device according to claim 19, further comprising a channel estimator configured to determine an estimate for transmission characteristics of the communication channel.

* * * * *